United States Patent
Lee et al.

(10) Patent No.: US 10,280,988 B2
(45) Date of Patent: May 7, 2019

(54) CLUTCH ACTUATOR

(71) Applicants: HYUNDAI MOTOR COMPANY, Seoul (KR); KIA MOTORS CORPORATION, Seoul (KR)

(72) Inventors: Jin Woo Lee, Gangwon-do (KR); Eui Hee Jeong, Hwaseong-si (KR); Jeong Heon Kam, Seongnam-si (KR); Jong Min Kim, Busan (KR); In Tae Park, Hwaseong-si (KR); Jeong Kyu Lee, Suwon-si (KR); Seung Hun Cha, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 76 days.

(21) Appl. No.: 15/617,476

(22) Filed: Jun. 8, 2017

(65) Prior Publication Data

US 2018/0172082 A1   Jun. 21, 2018

(30) Foreign Application Priority Data

Dec. 15, 2016 (KR) .................. 10-2016-0171214

(51) Int. Cl.
  *F16D 23/12* (2006.01)
  *F16D 13/75* (2006.01)
  *F16D 28/00* (2006.01)

(52) U.S. Cl.
  CPC ........... *F16D 23/12* (2013.01); *F16D 13/752* (2013.01); *F16D 28/00* (2013.01); *F16D 2023/123* (2013.01)

(58) Field of Classification Search
  CPC .... F16D 23/12; F16D 28/00; F16D 2023/123; F16D 13/75; F16D 13/757; F16D 13/48; F16D 13/385; F16D 13/52; F16D 25/126; F16D 13/71; F16D 13/755; F16D 13/50; F16D 13/70; F16D 2013/706; F16D 2021/0684; F16D 21/06; F16D 43/10;

(Continued)

(56) References Cited

U.S. PATENT DOCUMENTS

| 5,984,072 A | * | 11/1999 | Leimbach | ............... F16D 23/12 192/111.12 |
| 2009/0223772 A1 | * | 9/2009 | Burkhart | ............... F16D 13/752 192/70.252 |
| 2014/0166429 A1 | * | 6/2014 | Kim | .................. F16D 23/12 192/99 R |

FOREIGN PATENT DOCUMENTS

| KR | 10-0836687 | 6/2008 |
| KR | 10-2012-0011527 | 2/2012 |

(Continued)

*Primary Examiner* — Jacob S. Scott
*Assistant Examiner* — Lillian T Nguyen
(74) *Attorney, Agent, or Firm* — Brinks Gilson & Lione

(57) ABSTRACT

A clutch actuator includes: a reduction gear to rotate in a housing by a motor; a connecting rod having a first end connected to the reduction gear; a pair of levers provided on a hinge shaft in the housing, and connected to a second end of the connecting rod to rotate according to a rotation of the reduction gear; a push rod contacting with a clutch actuator fork; and a wear compensating unit movably coupled between the levers in a vertical direction and provided with an inclined surface contacting a first cam. In particular, the push rod has one end extended outwardly of the housing and is coupled with the first cam of which one end is movably inserted into the first hole of the levers.

10 Claims, 7 Drawing Sheets

(58) Field of Classification Search
CPC ........ F16D 13/58; F16D 13/583; F16D 13/64; F16D 13/648; F16D 2013/581; F16D 23/14; F16D 25/0638; F16D 65/54; F16D 13/38; F16D 13/752; F16D 2023/141; F16D 2055/0062; F16D 2055/0091; F16D 2121/14; F16D 2250/0084; F16D 23/143; F16D 25/088; F16D 43/12; F16D 55/224; F16D 55/2245; F16D 65/46; F16D 67/02; F16D 11/14; F16D 13/28; F16D 13/42; F16D 13/505; F16D 13/585; F16D 13/69; F16D 2013/565; F16D 2013/642; F16D 2021/0607; F16D 2021/0692; F16D 2023/126; F16D 2048/0203; F16D 2048/0212; F16D 2048/0275; F16D 2055/0058; F16D 2121/16; F16D 2121/22; F16D 2125/10; F16D 2125/36; F16D 2125/38; F16D 2125/66; F16D 2127/10; F16D 21/00; F16D 2300/08; F16D 2300/24; F16D 23/144; F16D 23/148; F16D 2500/1024; F16D 2500/50825; F16D 2500/5104; F16D 2500/5114; F16D 2500/70406; F16D 25/06; F16D 25/082; F16D 25/086; F16D 25/10; F16D 25/12; F16D 25/14; F16D 27/004; F16D 27/115; F16D 43/08; F16D 43/18; F16D 43/213; F16D 43/25; F16D 43/284; F16D 47/02; F16D 48/02; F16D 48/066; F16D 55/025; F16D 55/227; F16D 55/228; F16D 55/26; F16D 55/46; F16D 59/02; F16D 65/18; F16D 65/42; F16D 65/543; F16D 65/567; F16D 65/58; F16D 65/74; F16D 67/04; F16D 7/025
See application file for complete search history.

(56) References Cited

FOREIGN PATENT DOCUMENTS

| KR | 10-1526789 | 6/2015 |
| KR | 10-1543985 | 8/2015 |
| KR | 10-2016-0001668 | 1/2016 |

* cited by examiner

CLUTCH ACTUATOR

CROSS REFERENCE TO RELATED APPLICATION

The present application claims priority to and the benefit of Korean Patent Application No. 10-2016-0171214, filed on Dec. 15, 2016, the entire contents of which is incorporated herein by reference.

FIELD

The present disclosure relates to a clutch actuator for a clutch.

BACKGROUND

The statements in this section merely provide background information related to the present disclosure and may not constitute prior art.

Generally, a manual transmission transmits a force through a tappet of a clutch release cylinder by an oil pressure generated from a clutch master cylinder when a driver steps on a clutch pedal and transmits a force to a clutch diaphragm spring by allowing the force transmitted through the tappet to push a clutch release fork to thereby move a release bearing in an axial direction.

The clutch is disposed between an engine and the transmission and is connected between an engine side flywheel and a transmission input shaft to transmit or block a torque of the engine to the transmission.

By the way, in the case of the clutch pedal and the hydraulic cylinder, it is troublesome for a driver to directly operate the clutch pedal, and the driving feeling and the driving safety are greatly influenced by the skill of the driver. Therefore, recently, an automated manual transmission and a double clutch transmission tend to be used.

A clutch actuator carries out a clutch interruption operation of the automated manual transmission and the double clutch transmission. One example of the clutch actuator is disclosed in a related art.

As a means for interrupting power at the time of shifting during the transfer of the power of the engine to wheels through the transmission, the clutch is configured to transmit power by a frictional force. The frictional force is generated from disks provided to face each other on one side of a flywheel provided on a crank shaft of the engine and on one side of an input shaft of the transmission.

A clutch disc of the clutch is provided with a friction material for generating a frictional force and is severely worn due to the repeated interruption operation of the clutch. We have discovered that the disk wear causes a problem that the clutch operated by the clutch actuator is incompletely operated.

The matters described as the related art have been provided only for assisting in the understanding for the background of the present disclosure and should not be considered as corresponding to the related art known to those skilled in the art.

SUMMARY

The present disclosure proposes a clutch actuator capable of keeping a stroke control position of the actuator the same by compensating for a movement of a push rod using a wear compensating unit in a clutch housing, when a clutching facing wear occurs.

In one form of the present disclosure, a clutch actuator includes: a reduction gear configured to rotate in the housing by a torque of a motor; a connecting rod having a first end connected to the reduction gear; a pair of levers configured to be provided on a hinge shaft in the housing, connected to a second end of the connecting rod, to rotate according to a rotation of the reduction gear, and have a first hole in a horizontal direction provided in an upper portion of the pair levers with respect to the hinge shaft; a push rod configured to be in contact with clutch actuator fork, having a first end extended outwardly of the housing, be coupled with a first cam of which one end is movably inserted into the first hole to operate the clutch actuator fork while linearly moving according to the rotation of the at least one lever of the pair of levers; and a wear compensating unit configured to be movably coupled between the pair of levers in a vertical direction and provided with an inclined surface contacting the first cam to adjust a position of the first cam while vertically moving based on a degree of a clutch facing wear.

The pair of levers may be provided with a second hole and a third hole in a horizontal direction that are provided in a lower portion of the pair of levers with respect to the hinge shaft, and a second cam and a third cam may be inserted into the second hole and the third hole, respectively.

The wear compensating unit may include: a first plate having a first inclined surface configured to contact the first cam provided at an upper end of the first plate, and a second inclined surface configured to contact the second cam provided at a lower end of the first plate to be moved downwardly when the first cam is moved in one direction so as to move the second cam in another direction; and a second plate having a third inclined surface configured to contact the second cam provided with a lower end portion of the second plate, and a fourth inclined surface configured to contact the third cam provided at an upper end portion of the second plate to be moved upwardly when the second cam is moved in the another direction to thereby move the third cam in the another direction.

The second end of the connecting rod may be coupled to the third cam.

The first inclined surface may be formed in a direction in which the first plate is moved downward when the first cam is moved in the one direction and the second inclined surface may be formed in a direction in which the second cam is moved in the another direction when the first plate is moved downward, and the third inclined surface and the fourth inclined surface may be formed in a direction opposite to a direction in which the second inclined surface is headed.

A plurality of rivets may be formed between the pair of levers, and a plurality of vertical long holes may be formed at corresponding positions to the plurality of rivets so that the rivets are inserted into the wear compensating unit.

The push rod may have a middle portion protrudedly provided with a protrusion and a second end inserted into a pivot, and a compression spring may be provided between the protrusion and the pivot of the push rod.

One end of the pivot may be provided with a groove into which the first cam is inserted, and thus the pivot and the push rod may be integrally formed with respect to the first cam.

An auxiliary spring may be connected between the lower end of the pair of levers and the housing.

The clutch actuator may further include: an absorption spring having a first end fixed in the housing and a second end configured to contact a stopper protruding on one side of the reduction gear to reduce or prevent a backlash of the reduction gear.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
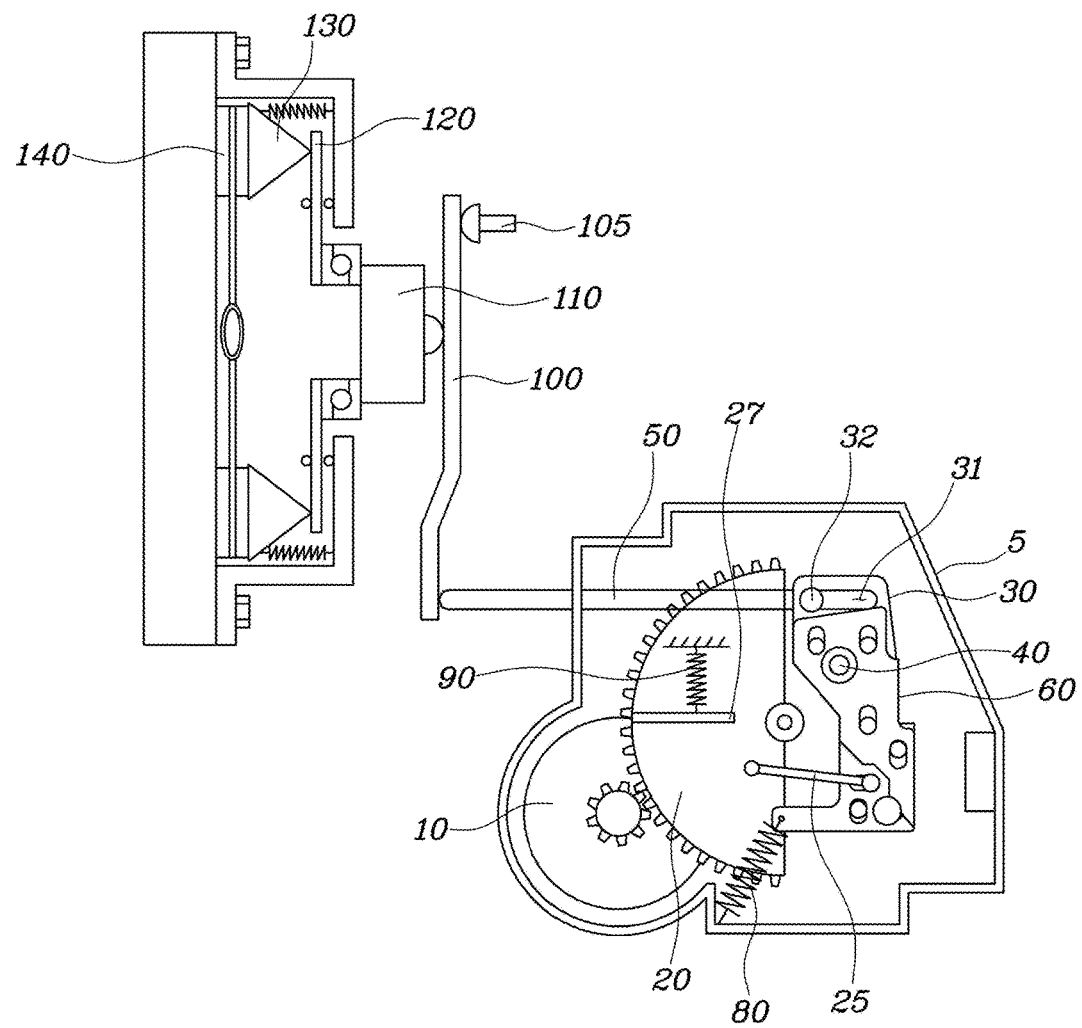
FIG. 1 is a cross-sectional view of a clutch actuator in one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 2:
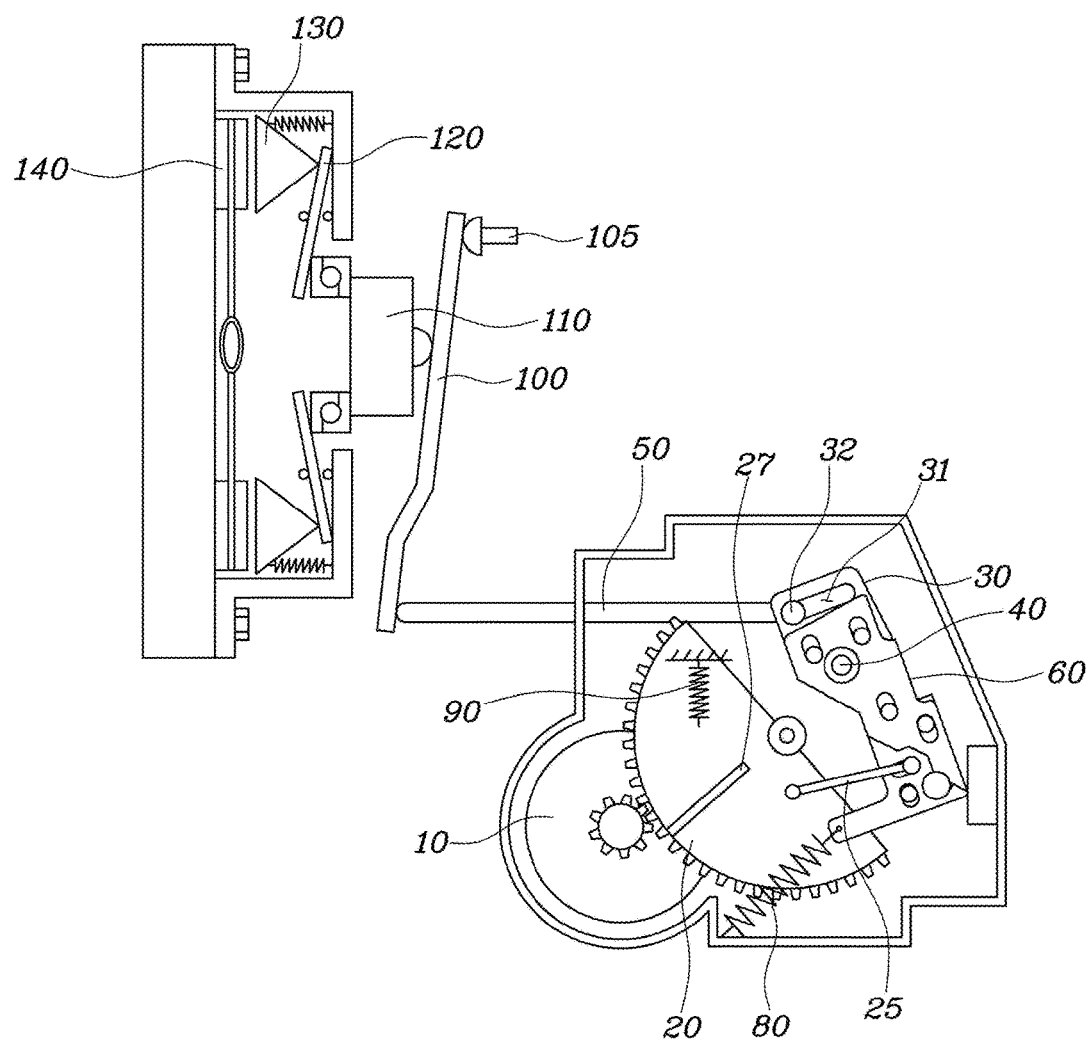
FIG. 2 is a cross-sectional view illustrating an operation of the clutch actuator upon engagement of the clutch in one the form of the present disclosure.
Figure 3:
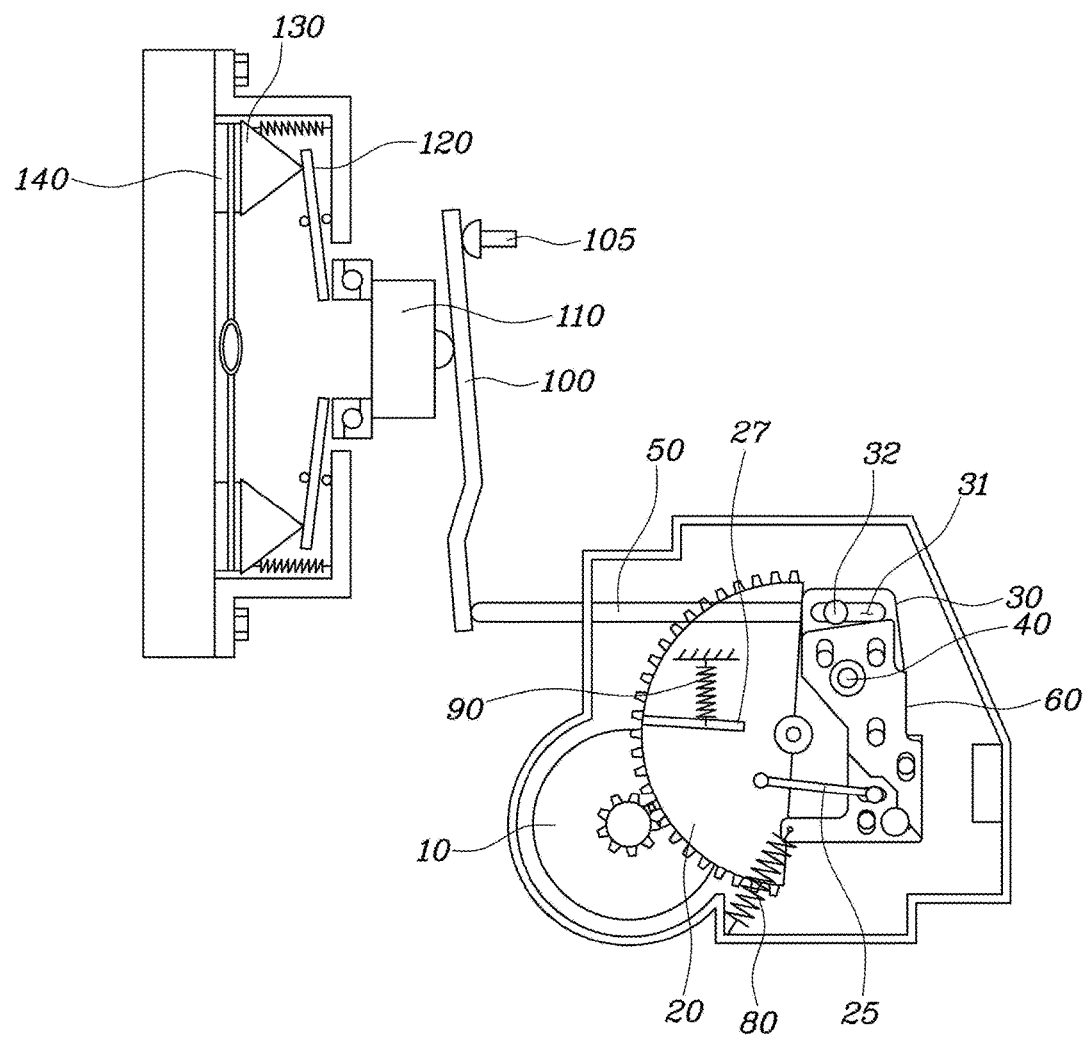
FIG. 3 is a cross-sectional view illustrating the operation of the clutch actuator upon a clutch wear in the form of the present disclosure.

FIG. 1 is a cross-sectional view of a clutch actuator, FIG. 2 is a cross-sectional view illustrating an operation of the clutch actuator upon engagement of the clutch, and FIG. 3 is a cross-sectional view illustrating the operation of the clutch actuator upon a clutch wear.

Referring first to FIG. 1, a clutch actuator in one form of the present disclosure includes: a reduction gear 20 configured to rotate in a housing 5 by a torque of a motor 10; a connecting rod 25 having one end connected to the reduction gear 20; a pair of levers 30 configured to be provided on a hinge shaft 40 in the housing 5, connected to the other end of the connecting rod 25 to rotate according to a rotation of the reduction gear 20, and have a first hole 31 in a horizontal direction provided in an upper portion thereof with respect to the hinge shaft 40. The clutch actuator further includes a push rod 50 that is in contact with an actuator fork 100 while extending outwardly of the housing 5, coupled with a first cam 32 of which the other end is movably inserted into the first hole 31 to operate the clutch actuator fork 100 while linearly moving according to the rotation of the lever 30. The clutch actuator further includes a wear compensating unit 60 which is movably coupled between the levers 30 in a vertical direction and provided with an inclined surface contacting the first cam 32 to adjust a position of the first cam 32 while vertically moving depending a degree of a clutch facing wear. The motor 10 may rotate based on a control signal of a transmission control unit (TCU). A gear applied to a shaft of the motor 10 is engaged with the reduction gear 20 and thus the reduction gear 20 is supplied with a torque of the motor 10.

As illustrated in FIG. 2, if the reduction gear 20 rotates, a torque is transmitted to the lever 30 through the connecting rod 25, and the push rod 50 is pushed forward by the rotation of the lever 30 to push one end of the clutch actuator fork 100. The other end of the clutch actuator fork 100 is fixed by a fulcrum 105 to push forward a release bearing 110 contacting a middle portion of the clutch actuator fork, and a pressure plate 130 is released from a clutch disk 140 while a diaphragm spring 120 connected thereto is bent. Here, a point at which the lever 30 rotates to contact the housing 5 is designated as a control reference point.

Meanwhile, the wear compensating unit 60 is inserted between the pair of levers 30. In one form, as illustrated in FIG. 3, when the clutch disc 140 is worn and thus the first cam 32 pushed backward along the first hole 31 by the push rod 50, the wear compensating unit 60 switches the backward pushing to a vertical direction to inhibit or prevent a distance of the control reference point of the lever 30 and the housing 5 from being changed, thereby inhibiting or preventing a touch point from being changed. Therefore, the stroke control of the clutch actuator may be accurately performed even if the clutch face wear occurs.

Figure 4:
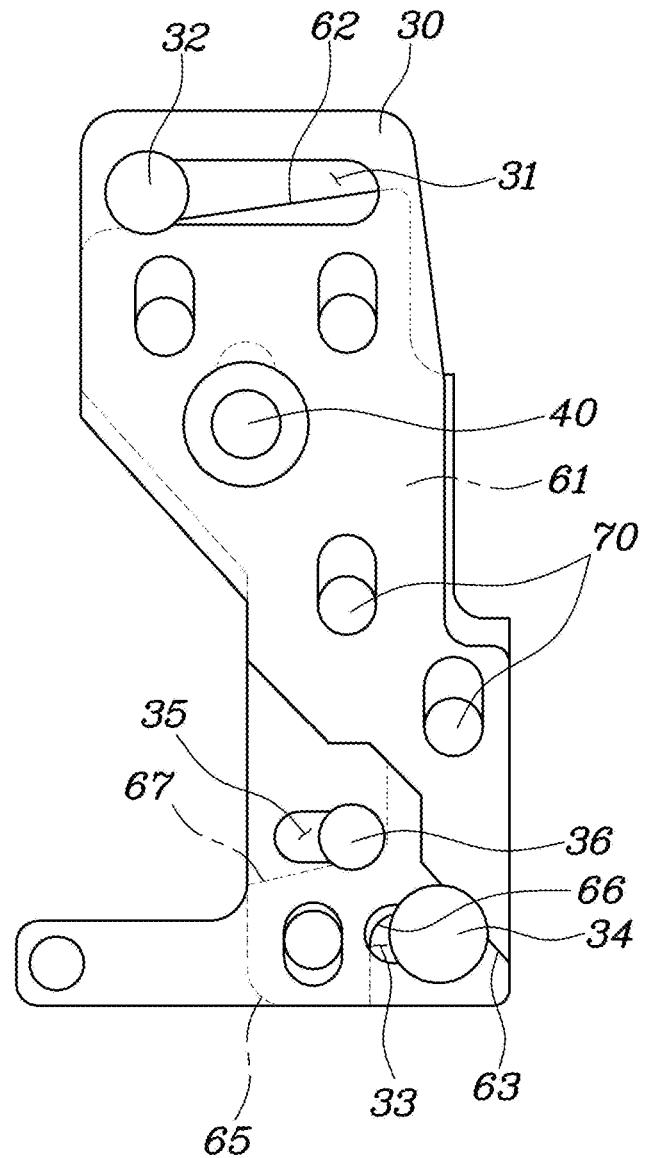
FIG. 4 is a front view illustrating a lever and a wear compensating unit in one form of the present disclosure.
Figure 5:
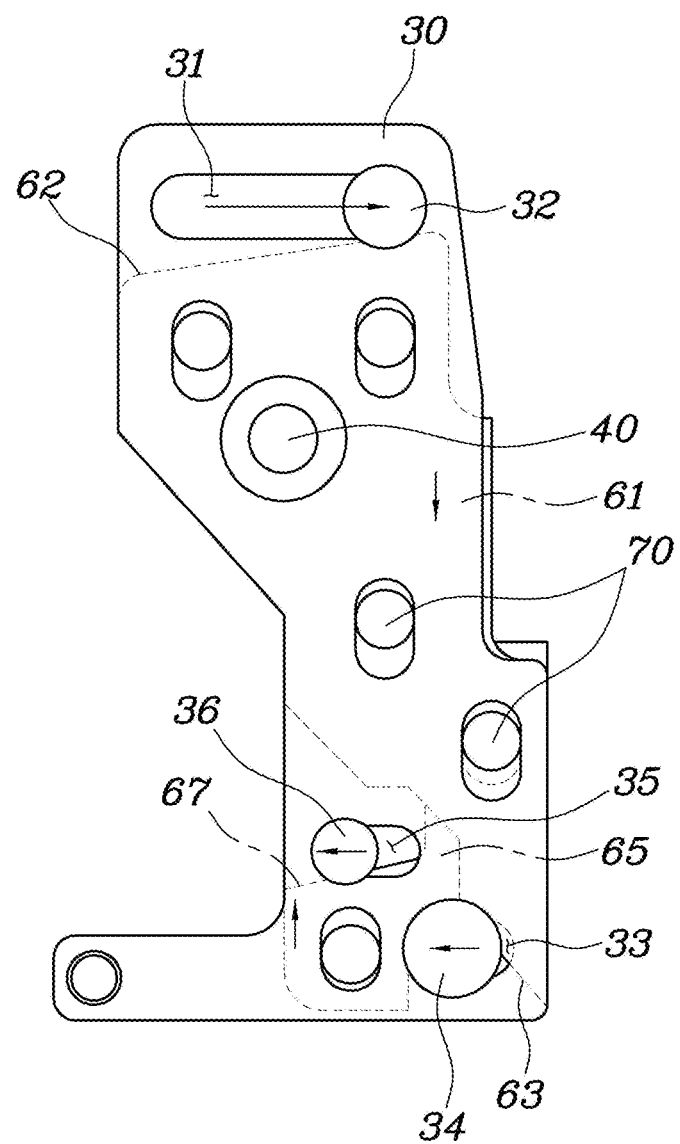
FIG. 5 is a front view illustrating an operation of the wear compensating unit in the form of the present disclosure.

FIG. 4 is a front view illustrating a lever and a wear compensating unit as one form of the present disclosure, and FIG. 5 is a front view illustrating an operation of the wear compensating unit. Referring to FIGS. 4 and 5, the levers 30 are provided with a second hole 33 and a third hole 35 in a horizontal direction that are provided in a lower portion of the lever 30 with respect to the hinge shaft 40, and a second cam 34 and a third cam 36 are inserted into the second hole 33 and the third hole 35, respectively.

Further, the wear compensating unit 60 may include a first plate 61 configured to have an inclined surface 62 contacting the first cam 32 provided at an upper end of first plate 61 and a second inclined surface 63 contacting the second cam 34 provided at a lower end of the first plate 61 to be moved downwardly when the first cam 32 is moved in one direction to thereby move the second cam 34 in the other direction. A second plate 65 has a third inclined surface 67 contacting the second cam 34 provided with a lower end portion of the second plate 65 and a fourth inclined surface 67 contacting the third cam 36 provided at an upper end portion of the second plate 65 to be moved upwardly when the second cam 34 is moved in the other direction to thereby move the third cam 36 in the other direction.

At this point, the other end of the connecting rod 25 is provided to be coupled to the third cam 36.

Further, the first inclined surface 62 is formed in a direction in which the first plate 61 is moved downward when the first cam 32 is moved in one direction and the second inclined surface 63 is formed in a direction in which the second cam 34 is moved in the other direction when the first plate 61 is moved downward and the third inclined surface 66 and the fourth inclined surface 67 may be formed in a direction opposite to the direction in which the second inclined surface 63 is headed.

As illustrated in FIG. 4, before the clutch facing wear occurs, the first cam 32 coupled with the other end of the push rod is positioned at one side of the first hole 31 and the second cam 34 and the third cam 36 are positioned at the other side of the second hole 33 and the third hole 35, respectively. This is because the reduction gear 20 is fixed and thus the third cam 36 is fixed to the other side of the third hole 35. As a result, the second plate 65 is kept moved downward and the first plate 61 is kept moved upward, by the fixed force transmitted to the second cam 34 and the first cam 32.

If the clutch facing wear occurs, the push rod 50 is pushed backward as illustrated in FIG. 3, and thus the first cam 32 is moved to the other side along the first hole 31 as illustrated in FIG. 5. The first plate 61 is moved downward by the first inclined plane 62 contacting with the first cam 32 and the second cam 34 is moved to the other side along the second hole 33 by the second inclined plane 63. Therefore, the second plate 65 is moved upward by the third inclined surface 66 and the fourth cam 36 contacting the fourth inclined surface 67 is moved to the other side to push the connecting rod 25 forward.

Therefore, even if a back stroke occurs in the clutch actuator fork due to the clutch facing wear, the control stroke distance between the lever 30 and the housing 5 is not changed, such that the accurate clutch actuator control may be performed.

A plurality of rivets 70 are formed between the levers 30 and a plurality of vertical long holes may be formed at corresponding positions so that the rivets 70 are inserted into the wear compensating unit 60.

Therefore, the first and second plates 61 and 65 may be vertically moved between the levers 30 but may be inhibited or prevented from moving to other positions.

Figure 6:
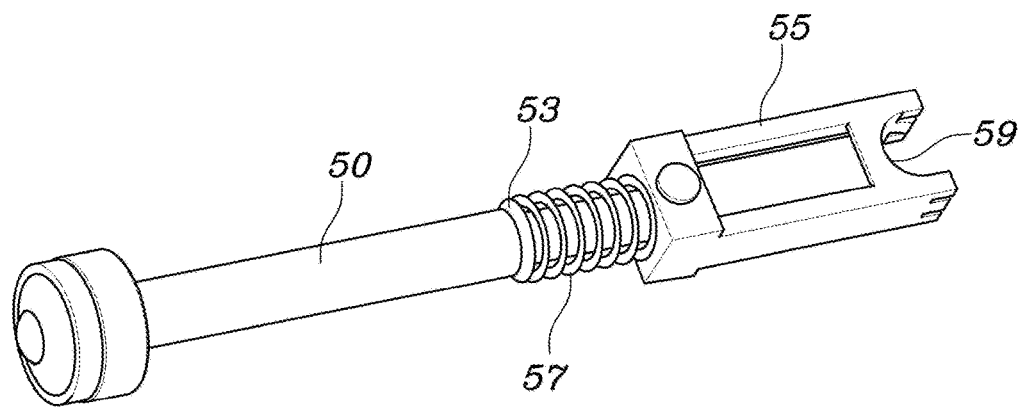
FIG. 6 is a view illustrating in detail a push rod in one form of the present disclosure.

Meanwhile, FIG. 6 is a view illustrating in detail the push rod in one form of the present disclosure. Referring to FIG. 6, the push rod 50 has a middle portion provided with a protrusion 53 and the other end inserted into a pivot 55, in which a compression spring 57 is provided between the protrusion 53 and the pivot 55 of the push rod 50. That is, it is possible to inhibit or prevent the push rod 50 from being pushed backward by simple shaking.

Further, the other end of the pivot 55 is provided with a groove 59 into which the first cam 32 is inserted, and thus the pivot 55 and the push rod 50 may be integrally formed with respect to the first cam 32. Therefore, the push rod 50 may be provided to be linearly moved even if the lever 30 rotates.

Figure 7:
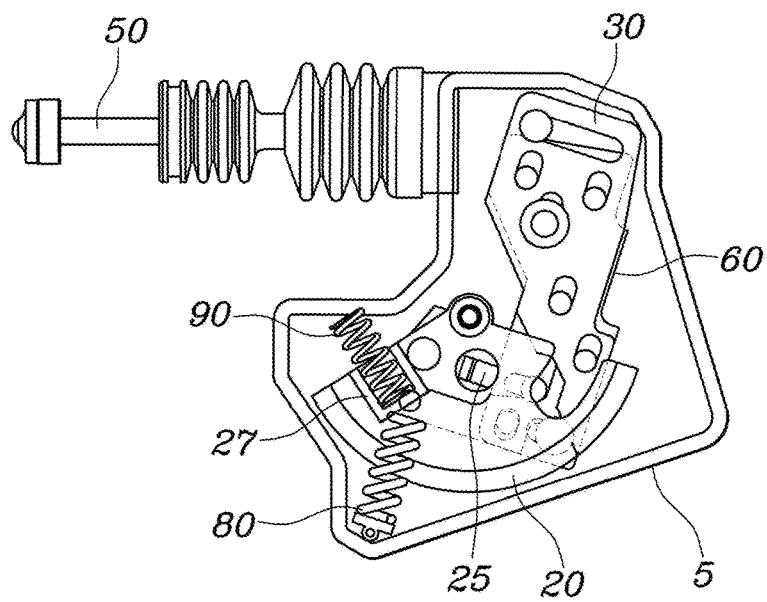
FIG. 7 is a view illustrating the operation of the clutch actuator upon the engagement of the clutch wear in the form of the present disclosure.
Figure 8:
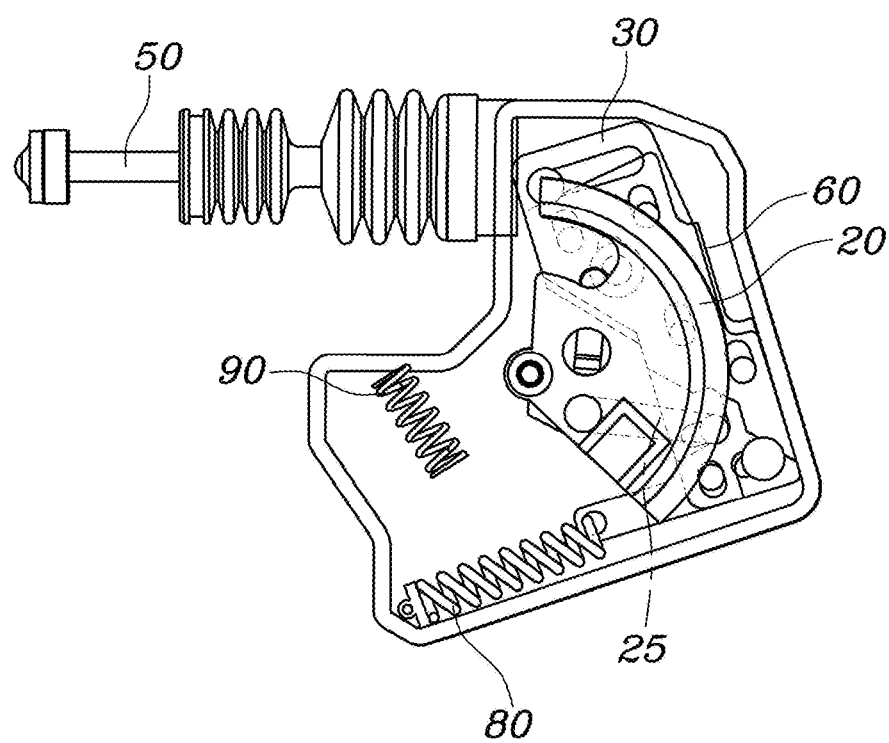
FIG. 8 is a view illustrating the operation of the clutch actuator upon disengagement of the clutch wear in the form of the present disclosure.

FIG. 7 is a view illustrating the operation of the clutch actuator upon the engagement of the clutch wear in one form of the present disclosure, and FIG. 8 is a view illustrating the operation of the clutch actuator upon disengagement of the clutch wear.

Referring to FIGS. 7 and 8, an auxiliary spring 80 may be connected between the lower end of the lever 30 and the housing 5. That is, the auxiliary spring 80 is provided to apply a force to restore the lever 30 to a state in which the clutch is released, thereby reducing a load of the motor.

Further, the clutch actuator may further include an absorption spring configured to have one end fixed in the housing 5 and the other end provided to contact a stopper 27 protruding on one side of the reduction gear 20 to reduce or prevent a backlash of the reduction gear 20.

Figure 9:
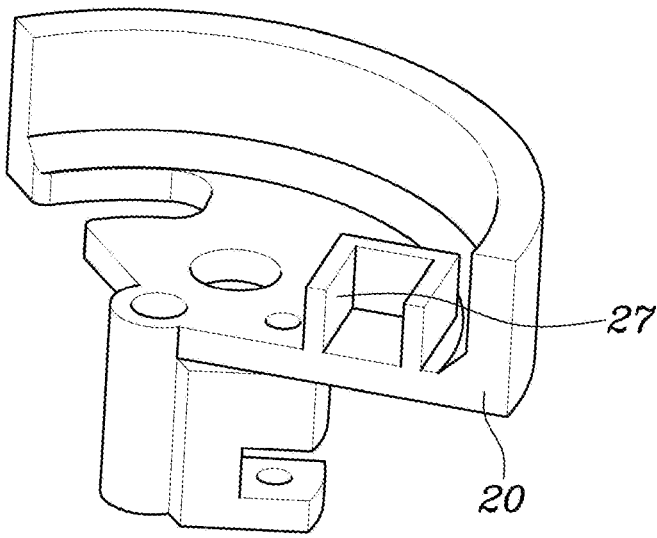
FIG. 9 is a perspective view illustrating a reduction gear in the form of the present disclosure.

FIG. 9 is a perspective view illustrating a reduction gear in one form of the present disclosure. Referring to FIGS. 7 to 9, one end of the absorption spring 90 is kept fixed in the housing 5, and when a back stroke force is transmitted to the reduction gear 20, the absorption spring 90 abuts to the stopper 27 of the reduction gear 20, thereby absorbing the backlash force of the reduction gear 20.

In addition, a boot inserted into the push rod 50 may be provided outside the housing 5 to reduce or prevent foreign matters from penetrating into the clutch housing and to provide water tightness with the push rod 50.

The clutch actuator having the above-mentioned structure may keep the control stroke position of the actuator the same even if the clutch facing wear occurs, thereby improving the accuracy of the stroke control.

Although the present disclosure has been illustrated and described with respect to specific exemplary forms, it will be obvious to those skilled in the art that the present disclosure may be variously modified and altered without departing from the spirit and scope of the present disclosure.

What is claimed is:

1. A clutch actuator, comprising:
   a reduction gear configured to rotate in a housing by a motor;
   a connecting rod having a first end connected to the reduction gear;
   a pair of levers configured to be provided on a hinge shaft in the housing, connected to a second end of the connecting rod, rotate according to a rotation of the reduction gear, and have a first hole in a horizontal direction provided in an upper portion of the pair of levers with respect to the hinge shaft;
   a push rod configured to be in contact with a clutch actuator fork, having a first end extended outwardly of the housing, be coupled with a first cam of which one end is movably inserted into the first hole to operate the clutch actuator fork while linearly moving according to the rotation of at least one lever of the pair of levers; and
   a wear compensating unit configured to be movably coupled between the pair of levers in a vertical direction and provided with a first inclined surface contacting the first cam to adjust a position of the first cam while vertically moving based on a degree of a clutch facing wear.

2. The clutch actuator of claim 1, wherein the pair of levers are provided with a second hole and a third hole in a horizontal direction that are provided in a lower portion of the pair of levers with respect to the hinge shaft, and a second cam and a third cam are movably inserted into the second hole and the third hole, respectively.

3. The clutch actuator of claim 2, wherein the wear compensating unit includes:
   a first plate having the first inclined surface configured to contact the first cam provided at an upper end of the first plate, and a second inclined surface configured to contact the second cam provided at a lower end of the first plate to be moved downwardly when the first cam is moved in one direction so as to move the second cam in another direction; and
   a second plate having a third inclined surface configured to contact the second cam provided with a lower end portion of the second plate, and a fourth inclined surface configured to contact the third cam provided at an upper end portion of the second plate to be moved upwardly when the second cam is moved in the another direction to thereby move the third cam in the another direction.

4. The clutch actuator of claim 3, wherein the second end of the connecting rod is coupled to the third cam.

5. The clutch actuator of claim 3, wherein the first inclined surface is formed in a direction in which the first plate is moved downward when the first cam is moved in the one direction, the second inclined surface is formed in a direction in which the second cam is moved in the another direction when the first plate is moved downward, and the third inclined surface and the fourth inclined surface are formed in a direction opposite to a direction in which the second inclined surface is headed.

6. The clutch actuator of claim 1, wherein a plurality of rivets are formed between the pair of levers, and
   a plurality of vertical long holes are formed at corresponding positions to the plurality of rivets so that the rivets are inserted into the wear compensating unit.

7. The clutch actuator of claim 1, wherein the push rod has a middle portion protrudedly provided with a protrusion and a second end inserted into a pivot, and
   a compression spring is provided between the protrusion and the pivot of the push rod.

8. The clutch actuator of claim 7, wherein one end of the pivot is provided with a groove into which the first cam is inserted, and thus the pivot and the push rod are integrally formed with respect to the first cam.

9. The clutch actuator of claim 1, wherein an auxiliary spring is connected between a lower end of the pair of levers and the housing.

10. The clutch actuator of claim 1, further comprising:
    an absorption spring having a first end fixed in the housing and a second end configured to contact a stopper protruding on one side of the reduction gear to inhibit a backlash of the reduction gear.

\* \* \* \* \*